(12) United States Patent
Döppling et al.

(10) Patent No.: US 6,383,113 B1
(45) Date of Patent: May 7, 2002

(54) TOROIDAL TRANSMISSION

(75) Inventors: Wolfgang Döppling; Manfred Winkler, both of Aurachtal (DE)

(73) Assignee: Ina Wälzlager Schaeffler OHG, Herzogenaurach (DE)

( * ) Notice: Subject to any disclaimer, the term of this patent is extended or adjusted under 35 U.S.C. 154(b) by 0 days.

(21) Appl. No.: 09/673,695
(22) PCT Filed: Feb. 27, 1999
(86) PCT No.: PCT/EP99/01390
  § 371 Date: Oct. 16, 2000
  § 102(e) Date: Oct. 16, 2000
(87) PCT Pub. No.: WO99/54645
  PCT Pub. Date: Oct. 28, 1999

(30) Foreign Application Priority Data

Apr. 22, 1998 (DE) .......................................... 198 17 955

(51) Int. Cl.[7] .............................................. F16H 15/38
(52) U.S. Cl. ................................ 476/73; 476/40; 476/46
(58) Field of Search ........................... 476/40, 42, 46, 476/72, 73; 74/449

(56) References Cited

U.S. PATENT DOCUMENTS

| | | |
|---|---|---|
| 1,175,677 A | 3/1916 | Barnes |
| 1,517,722 A | 12/1924 | Gerdes |
| 2,425,188 A | 8/1947 | Honigman |
| 3,446,088 A | 5/1969 | Grant |
| 4,275,610 A | 6/1981 | Kraus |

FOREIGN PATENT DOCUMENTS

| | | |
|---|---|---|
| DE | PS 677 000 | 6/1939 |
| DE | PS 817 984 | 10/1951 |
| DE | 831 627 C | 1/1952 |
| EP | 0 283 855 A | 9/1988 |
| FR | 1 060 647 A | 4/1954 |
| GB | 775 775 A | 5/1957 |

*Primary Examiner*—Lenard A. Footland
*Assistant Examiner*—William C. Joyce
(74) *Attorney, Agent, or Firm*—Henry M. Feiereisen

(57) ABSTRACT

A roller transmission, in particular toroidal transmission, with infinitely variable transmission ratio, includes a friction wheel (6) disposed between a driving disk (2) and driven disk (3) and rotatably mounted to a swingable carrier (7). The friction wheel has a circumferential friction surface (8) for interaction with confronting end faces (4, 5) of both disks (2, 3). The friction wheel (6) is made of two sheet metal parts (9, 10) interconnected outside the friction surface (8) and defining a partition plane which is disposed substantially transversely to the rotation axis of the friction wheel (6), wherein at least one cavity (15) is arranged between both sheet metal parts (9, 10).

13 Claims, 3 Drawing Sheets

TOROIDAL TRANSMISSION

The present invention relates to a roller transmission, in particular toroidal transmission, with infinitely variable transmission ratio. Transmissions of this type can be installed in motor vehicles to replace conventional manually shifted transmissions or automatic transmissions with torque converter.

BACKGROUND OF THE INVENTION

European Pat. No. EP 0528383-B discloses, for example, a infinitely variable toroidal transmission which has a driving disk and a driven disk in coaxial relationship. A friction wheel is positioned between both disks and has a peripheral friction surface for interaction with confronting end faces of both disks. Power is transmitted from the driving disk onto the friction wheel and from the friction wheel to the driven disk via a traction fluid. The traction fluid acts between the friction surface of the friction wheel and the end faces of the disks. The friction wheel is rotatably supported by a swingable carrier. Friction wheel, driving disk and driven disk are massive components which must have an extraordinarily high stiffness as the friction wheel is clamped between both disks at a pressure of about 12 tons. This pressure load is required to reliably transmit the circumferential forces, transmitted through frictional engagement, from the drive to the output. Roller transmissions of this type are characterized by a relatively high own weight which runs counter to the demand by the automobile industry for light constructions.

European Pat. No. EP 0 283 855-A1 describes a toroidal transmission having a friction wheel which is of lighter weight compared to the afore-described friction wheel as a consequence of its thin-walled configuration. However, thin-wall friction disks run the risk of buckling when exposed to high loads. The friction disk has a continuous circumferential collar for contacting the driving disk and the driven disk. This collar is not supported at its axial ends and thus can evade a radial load.

U.S. Pat. No. 1,175,667-A describes a toroidal transmission having a friction disk with a cavity for reducing the weight of the friction disk; the cavity is provided for receiving a lubricant which can exit through oil channels in order to lubricate the bearing of the friction disk and its shaft. In addition, a type of tire is attached to the friction disk for interaction with the driveshaft and the driven shaft. The tire represents an additional component which has to be attached through an additional working step.

OBJECT OF THE INVENTION

It is thus an object of the present invention to provide a roller transmission, having a reduced own weight while maintaining the required stiffness and being composed of a reduced number of single components.

SUMMARY OF THE INVENTION

In accordance with the invention, this object is attained by forming the friction wheel of two sheet metal parts interconnected outside the friction surface and defining a partition plane which is arranged substantially transversely to the rotation axis of the friction wheel, with at least one cavity disposed between both sheet metal parts. The cavity or cavities significantly reduce the weight of the toroidal transmission according to the invention. The cavity or cavities are so spaced about the perimeter of the friction wheel that the friction wheel turns reliably without unbalance. The cavity or cavities may be completely encompassed by both sheet metal parts, for example, in order to preclude an ingress of traction fluid into the cavities. The cavities may, however, also communicate with the surroundings of the friction wheel. The friction surface may be provided, for example, on a circumscribing collar of one of the sheet metal parts; No separate tire is then required. As a consequence of the interconnection of the sheet metal parts outside the friction surface, it is ensured that no butt edges are encountered in the area of the friction surface. Both sheet metal parts are so matched to one another that the collar is sufficiently supported on both axial ends but is prevented from freely jutting out, as this is the case, for example, with the fiction disk according to European Pat. No. EP 0 283 855.

The outer configuration of the friction wheel in relation to the massively shaped friction wheels may be substantially maintained. The axial extension of the friction wheels and the wall thickness of the sheet metal parts may be so sized that, on the one hand, a sufficiently large contact area of the friction wheel is ensured, and, on the other hand, a sufficient stiffness of the friction wheel is guaranteed at the radial pressure of about 12 tons. The friction wheel may be, optionally, further extended in axial direction to meet these conditions, whereby the volume of the cavity, bounded by the sheet metal parts, increases.

A further advantageous effect of the roller transmission according to the invention resides in the reduction of the adjusting forces for adjusting the friction wheels, as will be described hereinafter. A modification of the transmission ratio between drive and output—for example, to increase the output speed—is implemented by so tilting the carrier of the friction wheel that the friction surface bears, on the one hand, upon the driving disk radially further outwards, and, on the other hand, upon the driven disk radially further inwards. This means that the rotation axis of the rotating friction wheel is tilted during this adjustment. This adjustment of the rotation axis generates, however, undesired centrifugal forces which may render an adjustment movement more difficult. These centrifugal forces are dependent on the mass of the friction wheel, on the one hand, and on the speed of the friction wheel, on the other hand. As a consequence of the reduced mass of the friction wheels made of sheet metal, significantly reduced centrifugal forces are produced so that the adjustment of the friction wheels can be realized in a more simple manner.

A further advantage is the significantly lower costs for manufacturing the friction wheels of sheet metal compared to manufacturing costs for massive friction wheels which have to be machined in any event.

Oftentimes, the surface area of the friction wheel is convexly curved. Therefore, the confronting end faces of the driving disk and driven disk are concavely curved so that a reliable contact of the friction surface upon the end faces of both disks is ensured regardless of the position of the carrier. In order to provide a convex shape, the surface area of conventional massive friction wheels must be grinded. Grinding of the convex friction surface requires, however, particular care. When the surface area is grinded from both end faces inwardly, there is a risk that approximately in the axial center a circumferential edge is formed which can be seen by the naked eye only very difficult. Such edges may, however, cause the friction wheel to no longer run reliably during operation because the traction fluid can no longer reliably transmit the forces; Thus, inadmissibly high compression may be encountered in the area of the circumferential edge that may lead to a total breakdown of the friction wheel. Through the provision of the toroidal transmission according to the present invention, it is now possible to form the convex friction surface by way of a non-cutting process onto the disk-shaped sheet metal parts, without causing formation of such an edge.

Particular consideration should be directed to the interconnection of both sheet metal parts, when taking into account especially the great contact pressure forces. On the one hand, the operation of the friction surface should not be impaired by the interconnection of both sheet metal parts, while, on the other hand, care should be taken that the force flow in the friction wheel does not inadmissibly strain the interconnection. According to a further development of the invention, it is provided to weld together both sheet metal parts, with the welding seam located outside the friction surface. A welded connection or another connection can be realized in a particularly easy manner when the one disk-shaped sheet metal part is formed in one piece on its outer perimeter with a circumferential outer collar having an outer surface area defining the friction surface, whereas the other disk-shaped sheet metal is arranged within the outer collar and securely fixed—preferably by a welded connection—to the inner surface area of the outer collar. Both disk-shaped sheet metal parts may have substantially flat end faces so as to define therebetween a cavity bounded by the axial dimension of the collar. The other sheet metal part is suitably so disposed as to bear against the outer edge of the free end of the collar. In this manner, a deflection of the free end of the collar as a result of a high pressure load is precluded. As both sheet metal parts are substantially of flat configuration, the friction wheel according to the invention is not exposed or only slight exposed to a bending stress or shearing stress.

The outer surface area of the collar is convexly curved for formation of the friction surface. As already stated further above, the convex curvature on the collar of the one sheet metal part can be produced by shaping through a rolling process to impart the outer peripheral surface of the collar with the desired convex curvature. Other shaping processes are, however, also conceivable, for example the deep-drawing process. Should it be required, it is, of course, possible to later finish the outer surface area of the collar through a grinding process to produce the convex curvature or to optimize the already shaped convex surface area.

According to a further, particularly suitable, further development of the invention, the friction wheel is provided with a coaxial inner collar. This collar may be provided on both end faces of the friction wheel and project axially out. The collar may also be disposed axially inwards of the friction wheel.

Referring back to the exemplified embodiment, mentioned already above, with two disk-shaped sheet metal parts, the operation of the collar will now be described in more detail. The free ends of both inner collars may confront one another, with both collars demarcating together a hub opening for receiving a bolt which is in fixed rotative engagement with both sheet metal parts. This bolt may then be supported, e.g. by a rolling-contact bearing, upon the swingable carrier. In this case, the inner collars are arranged, preferably, within the axial extension of the sheet metal parts of substantially flat configuration.

The free end of both inner collars may, however, also be facing away from one another, whereby respective radial bearings are disposed between both inner collars and the carrier. No bolt is provided in this variation of the invention. The friction wheel may be supported directly by the carrier at interposition of the radial bearing. In this manner, a further reduction of mass is realized by the rolling transmission according to the invention.

In the preceding variation of the invention, the outer surface area of the inner collar may be formed for rolling bodies with a raceway, for example as ball groove, in the outer surface area. Therefore, the provision of a separate bearing race, for example for a radial deep groove ball bearing, is no longer necessary.

It may be required or suitable to provide at least one of both sheet metal parts with several depressions spaced about the circumference and jutting out in the direction of the other sheet metal part for significantly increasing the stiffness of the friction disk according to the invention. The depressions may, for example, jut out to such an extent as to bear upon the opposite sheet metal part. The depressions may be securely fixed in the area of contact with the other sheet metal, for example by spot welding. In this manner, the stiffness of the friction wheel is further enhanced. The support of the opposite sheet metal part upon the depressions prevents a buckling of the sheet metal part when exposed to the great radial load. Of course, both sheet metal parts may be provided with such depressions.

BRIEF DESCRIPTION OF THE DRAWINGS

Two exemplified embodiments of the invention will now be described with reference to a total of four figures, in which.

DETAILED DESCRIPTION OF THE PREFERRED EMBODIMENTS

Figure 1:
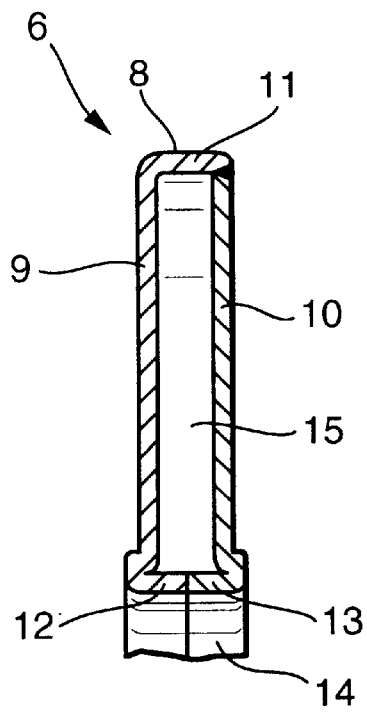
FIG. 1 is a longitudinal section of one half of a friction wheel according to the invention.
Figure 2:
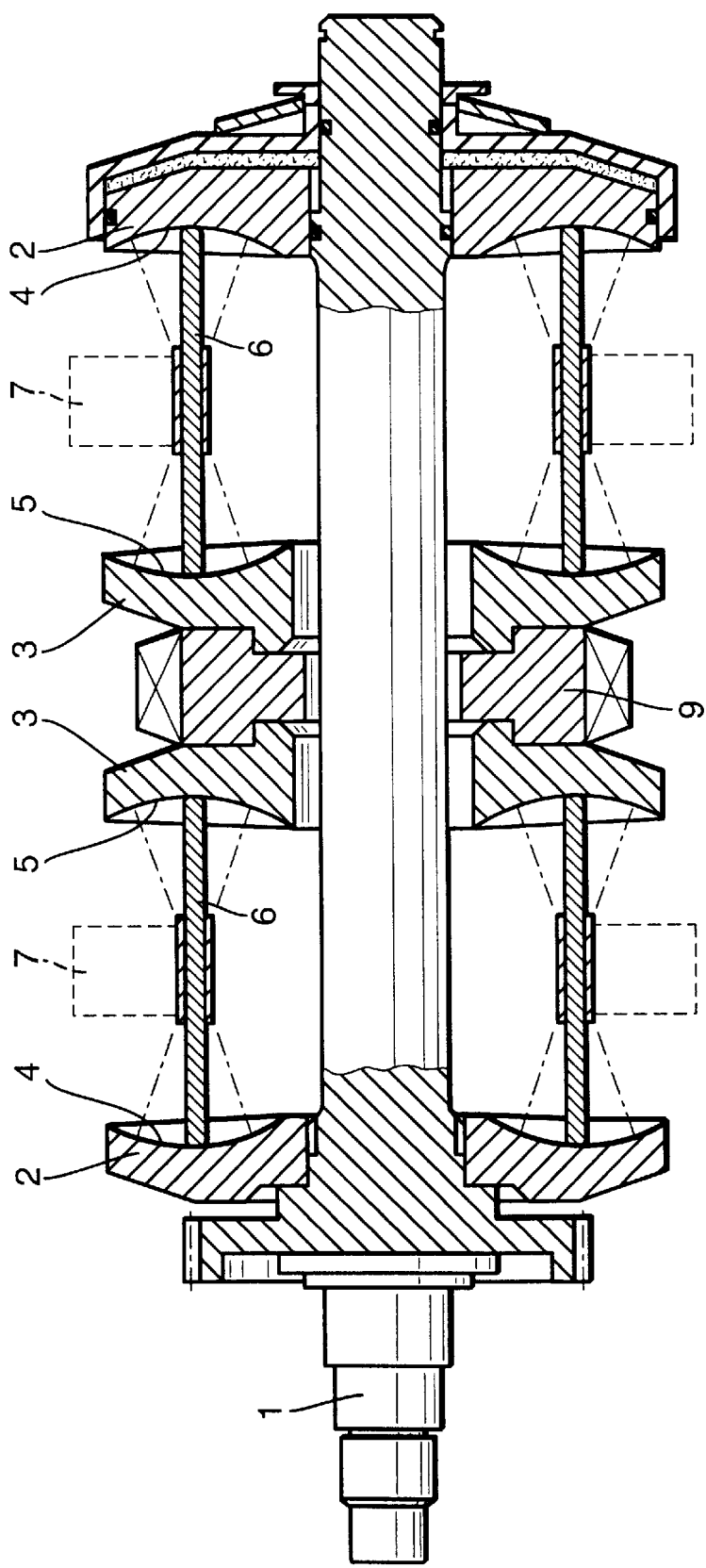
FIG. 2 is a schematic longitudinal section of a conventional toroidal transmission.

FIG. 1 shows a longitudinal section of a friction wheel according to the invention for use in a conventional toroidal transmission, as shown schematically in FIG. 2. Mounted on a driveshaft 1 are driving disks 2 and driven disks 3. The driving disks 2 are mounted in fixed rotative engagement with the driveshaft 1. The driven shafts 3 are positioned between both driving disks 2 and supported for rotation relative to the driveshaft 1. Confronting end faces of the neighboring driving disks 2 and driven disks 3 are provided with concavely curved contact surfaces 4, 5 for friction wheels 6. The friction wheels 6 are rotatably mounted to swingable carriers 7. About their circumference, the friction wheels 6 are provided with convex friction surfaces 8 which are pressed against the contact surfaces 4, 5. The driven disks 3 are mounted in fixed rotative engagement with a toothed ring 9 for attachment of further transmission components (not shown).

Figure 1A:
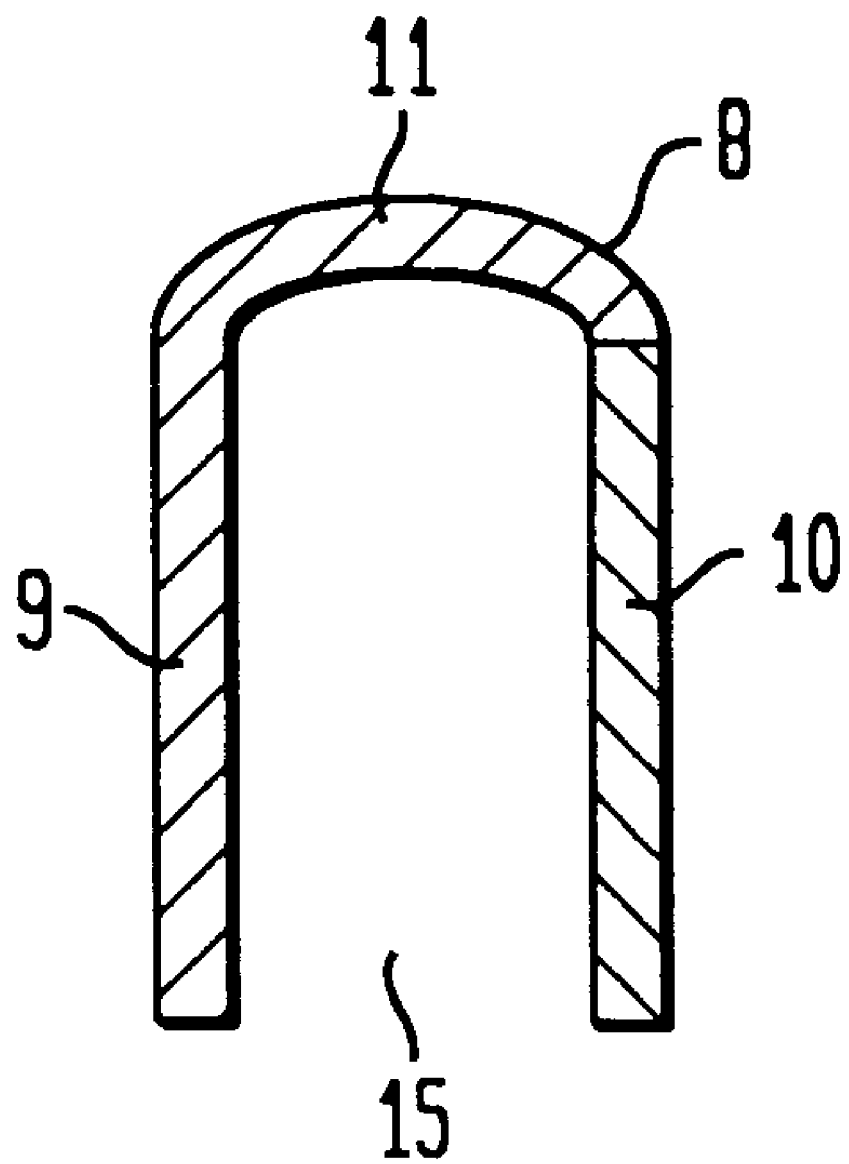
FIG. 1a shows a fragmentary sectional section of a modified embodiment of a friction wheel according to the invention.

The friction wheel 6 is made of two sheet metal parts of substantially flat configuration. The one sheet metal part 9 is provided in one piece about its outer perimeter with a circumferential outer collar 11 which projects axially in the direction of the other sheet metal part 10. Arranged radially inwards of the collar 11 is the other sheet metal part 10 and securely fixed about its circumference with the collar 11 through laser welding. The joint area between the collar and the other sheet metal part 10 is located at the fee end of the collar 11. This ensures that the collar 11 is not inadmissibly deflected when exposed to a radial load. As shown in FIG. 1*a*, the outer surface area of the collar 11 may also be convexly curved.

Both sheet metal parts 9, 10 are each provided in one piece about their inner circumference with a circumferential inner collar 12, 13, with both free ends of these collars 12, 13 confronting one another and bounding a hub opening 14 for receiving a carrier (not shown). Cavities 15 are defined between both sheet metal parts 9, 10.

Figure 3:
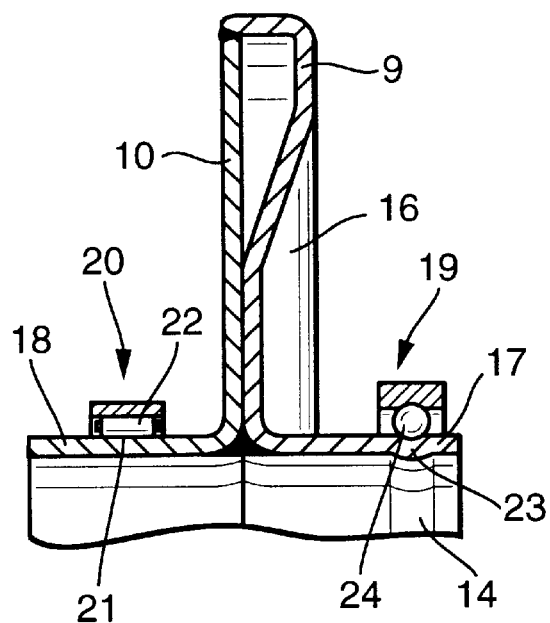
FIG. 3 is a longitudinal section of one half of another friction wheel according to the invention.

FIG. 3 shows a further friction wheel according to the invention which differs from the one shown in FIG. 2 substantially in that both sheet metal parts 9, 10 are each provided in one piece about their inner circumference with a circumferential inner collar 17, 18, having free ends which face away from one another, The one sheet metal part 9 has—like the sheet metal part 9 of FIG. 2—several depressions 16 evenly spaced about the circumference and jutting out in the direction of the other sheet metal part 10 for bearing against the other sheet metal part 10. Each depression 16 is securely fixed to the sheet metal part 10 through spot welding. The afore-mentioned bolt (not shown) can be completely eliminated here as a radial bearing 18, 19 is provided directly between the collars 17, 18 and the carrier 7 for support of the friction wheel 6 with respect to the carrier 7. Disposed on the inner collar 17 is a radial deep groove ball bearing 19, and disposed on the inner collar 18 is a radial needle bearing 20. The outer circumferential surface of the inner collar 18 is also a raceway 21 for needles 22 of the radial needle bearing. The collar 17 is formed on Its outer surface area with a ball groove 23 for rolling of balls 24 of the radial deep groove ball bearing 19.

Figure 4:
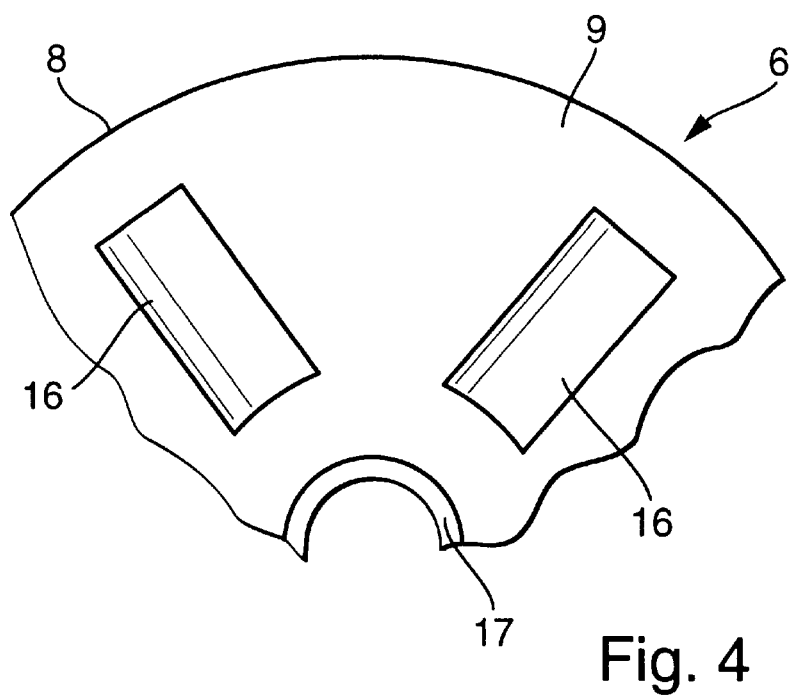
FIG. 4 is a top view of the friction wheel according to the invention shown in FIG. 3.

FIG. 4 shows a top view the friction wheel according to the invention of FIG. 3 to clearly show the depressions 16 spaced about the circumference.

What is claimed is:

1. A toroidal transmission with infinitely variable transmission ratio, comprising:

a driving first disk;

a driven second disk; and at least one friction wheel disposed between the first and second disks and rotatably mounted to a swingable carrier, said friction wheel having a circumferential friction surface for interaction with confronting end faces of the first and second disks, wherein the friction wheel is made of two sheet metal parts interconnected outside the friction surface to form a cavity therebetween and defining a partition plane which is disposed substantially transversely to a rotation axis of the friction wheel, wherein the sheet metal parts have a disk-shaped configuration, one of the disk-shaped sheet metal parts provided in one piece about its outer circumference with a circumferential outer collar which has an outer surface area defining the friction surface.

2. The transmission of claim 1, wherein both sheet metal parts are welded together at formation of a welding seam located outside the friction surface.

3. The transmission of claim 1, wherein the other one of the disk-shaped sheet metal parts is disposed within the outer collar and securely fixed to the outer collar.

4. The transmission of claim 1, wherein the outer surface area of the collar is convexly curved.

5. The transmission of claim 1, wherein the friction wheel is provided with an inner collar in coaxial relationship.

6. The transmission of claim 5, wherein each of the sheet metal parts has an inner circumference provided in one piece with a circumferential inner collar.

7. The transmission of claim 6, wherein the inner collar of one of the sheet metal parts and the inner collar of the other one of the sheet metal parts confront one another, with the inner collars bounding together a hub opening for receiving a bolt.

8. The transmission of claim 6, wherein the inner collar of one of the sheet metal parts and the inner collar of the other one of the sheet metal parts face away from one another, and further comprising two radial bearings, one of the radial bearings disposed between one of the inner collars and the carrier, and the other one of the radial bearings disposed between the other one of the inner collars and the carrier.

9. The transmission of claim 8, wherein one of the inner collars has an outer surface area forming a raceway for receiving rolling bodies.

10. The transmission of claim 9, wherein the outer surface area has formed therein a ball groove.

11. The transmission of claim 1, wherein the friction wheel has a circumference and is provided with depressions which are evenly spaced about the circumference for stiffening the friction wheel.

12. The transmission of claim 1, wherein at least one of the sheet metal parts has a circumference and is provided with depressions which are evenly spaced about the circumference and jutting out in the direction of the other one of the sheet metal parts.

13. The transmission of claim 12, wherein the depressions bear against the other one of the sheet metal parts.

\* \* \* \* \*